United States Patent [19]
Duncan

[11] Patent Number: 5,224,960
[45] Date of Patent: Jul. 6, 1993

[54] VEHICLE TOW BAR

[76] Inventor: Lee H. Duncan, 88806 Greenhill Rd., Eugene, Oreg. 97402

[21] Appl. No.: 669,803

[22] Filed: Mar. 15, 1991

[51] Int. Cl.$^5$ .............................................. B60D 1/00
[52] U.S. Cl. .................................................. 280/491.4
[58] Field of Search .............. 280/491.4, 491.3, 491.2, 280/491.1, 491.5, 401, 478.1, 479.1, 482

[56] References Cited

U.S. PATENT DOCUMENTS

| | | | |
|---|---|---|---|
| 4,577,883 | 3/1986 | Duncan | 280/491.4 |
| 4,856,805 | 8/1989 | Davis | 280/491.4 |
| 4,861,061 | 8/1989 | Frantz | 280/491.4 |
| 5,071,153 | 12/1991 | Duncan | 280/491.4 |

Primary Examiner—Mitchell J. Hill
Attorney, Agent, or Firm—Olson & Olson

[57] ABSTRACT

A vehicle tow bar includes a transverse cross member which mounts one pivotal, elongated leg assembly in fixed position at one end of the cross member and a second pivotal, elongated leg assembly for movement along the cross member between a collapsed condition closely adjacent the first leg assembly and an erected, operative position at the opposite end of the cross member. Stub shafts reinforce the ends of the cross member at the points of maximum stress. The ends of the leg assemblies opposite the cross member are connected to an apex frame which mounts a socket coupler component of a ball and socket type trailer hitch. Each leg assembly includes telescopic sections for adjusting the length of the leg assembly, and the locking mechanism releasably interconnects the telescopic sections to secure the latter in fully extended, operative towing condition. Flexible protective boots are provided about one of the telescoping leg sections of each leg assembly to protect the telescoping section against the deleterious effects of the surrounding environment and to contain lubricating grease and the like for constant lubrication of the telescoping leg sections.

4 Claims, 5 Drawing Sheets

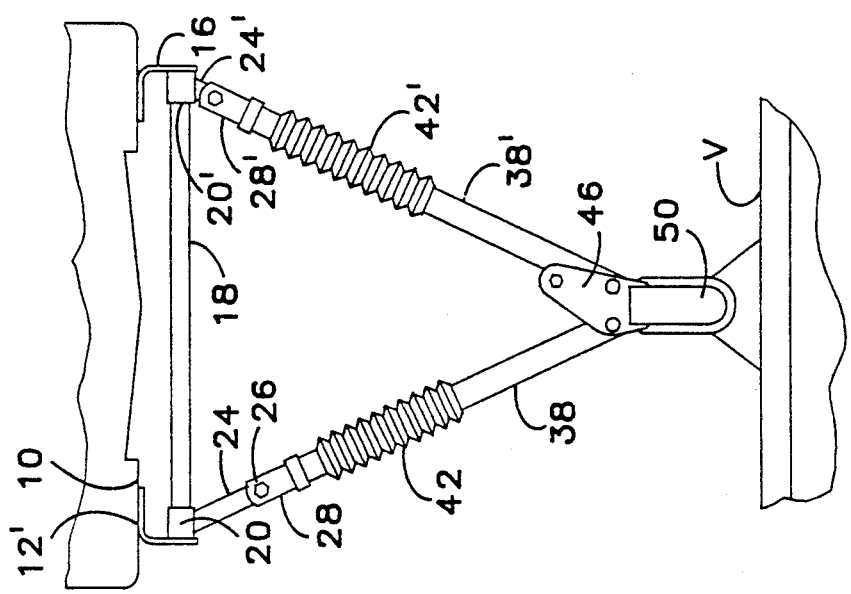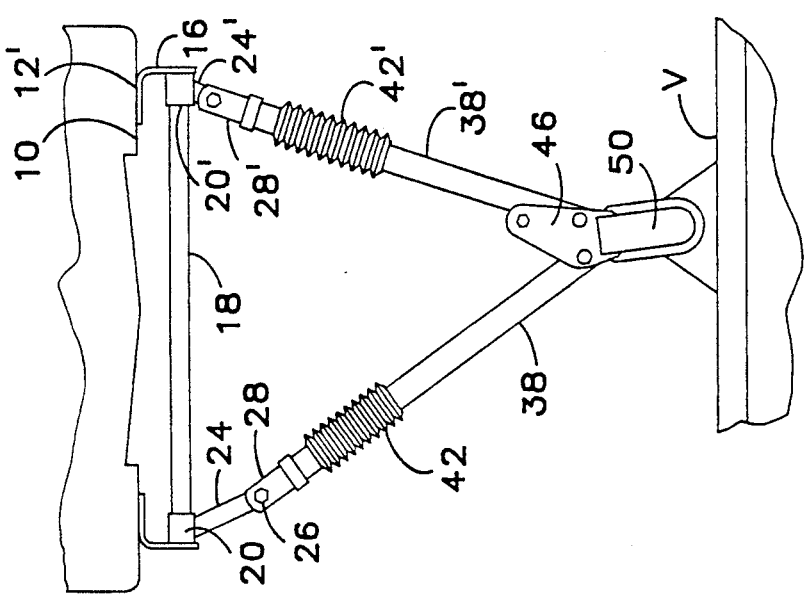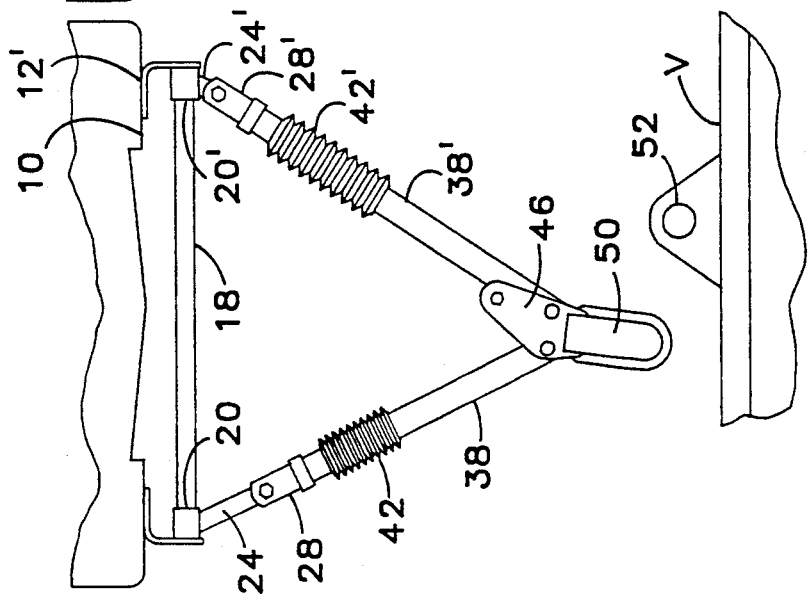

VEHICLE TOW BAR

BACKGROUND OF THE INVENTION

This invention relates to vehicle tow bars, and more particularly to collapsible tow bars arranged for permanent long-term attachment to a vehicle which is to be towed periodically, as is common with RV enthusiasts.

More specifically, the present invention relates to my earlier vehicle tow bar disclosed in U.S. patent application Ser. No. 428,791 filed, Oct. 30, 1989, now issued U.S. Pat. No. 5,071,153, dated Dec. 1, 1991 the present invention providing an improved construction which does not require the great degree of fabricating and machining of specialized parts required in the manufacture of my earlier invention.

Specifically, my earlier invention utilized a telescoping leg construction that required the fabrication of slotted elongated bar members from strengthened material and cooperating box beam members specifically dimensioned and configured for telescoping movement relative to the bar members. Specially configured locking means interconnecting the box beam and the slotted bar member also required significant machining of their many parts for successful operation to secure the leg sections releasably in locked towing condition, and no provision was made for the satisfactory lubrication of the telescoping leg members nor for their protection from dust, dirt, and other deleterious elements of the environment in use.

SUMMARY OF THE INVENTION

In its basic concept, this invention provides a pivotal, collapsible vehicle tow bar which comprises an "A" frame tongue member which mounts a trailer hitch coupler at its apex, the opposite ends of the legs being mounted for pivotal movement about a tubular cross member mounted to extend laterally across the front end of a vehicle to be towed, one of the "A" frame legs mounted for sliding movement along a length of the crossbar and the other leg fixed adjacent one longitudinal end of the crossbar, both legs comprising longitudinally extendable, two section telescoping rod and tube members that are releasably lockable when the legs are extended to desired maximum length in which the trailer hitch couple is positioned centrally between and forwardly of the pivotal mount of the legs on the cross bar.

It is by virtue of the foregoing basic concept that the principal objective of this invention is achieved; namely, the provision of an "A" frame type vehicle tow bar which is collapsible to a very compact storage condition and is pivotally movable throughout a wide range of positions which permit connection of the coupler to a trailer hitch on a tow vehicle that accordingly does not need to be accurately aligned with the vehicle to be towed in order to accomplish connection, and enjoys a construction which utilizes standard parts and thereby greatly reduces the amount of fabrication and assembly costs and time.

Another object and advantage of this invention is the provision of a vehicle tow bar of the class described which provides for constant lubrication of the telescoping leg sections and their protection from the deleterious elements of the surrounding environment.

Another object and advantage of this invention is the provisional vehicle tow bar of the class described which is significantly lighter in overall weight and is more convenient in operation than collapsible tow bars heretofore available have been.

Another object and advantage of this invention is the provision of a vehicle tow bar of the class described which is collapsible into a very compact storage condition, making it particularly convenient for use on small cars.

A still further object and advantage of this invention is the provision of a vehicle tow bar of the class described which is of simplified construction for economical manufacture and reliability of use.

The foregoing and other objects and advantages of this invention will appear from the following detailed description, taken in connection with the accompanying drawings of the preferred embodiment.

BRIEF DESCRIPTION OF THE DRAWINGS

FIGS. 7, 8 and 9 are fragmentary plan views illustrating consecutive steps involved in connecting the tow bar to a towing vehicle that is misaligned laterally from the vehicle to be towed.

DESCRIPTION OF THE PREFERRED EMBODIMENT

Figure 1:
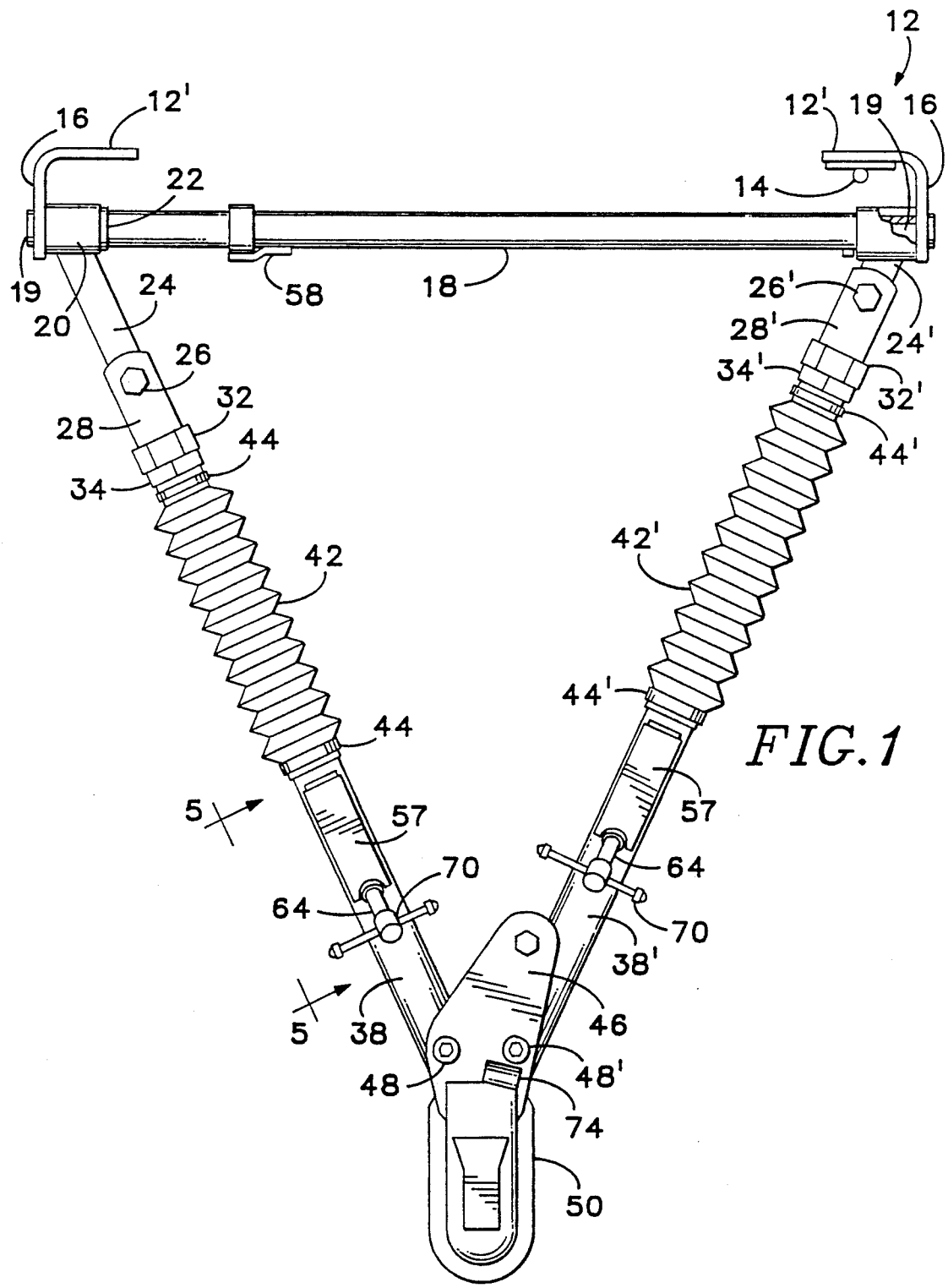
FIG. 1 is a plan view of a tow bar embodying the features of this invention, the tow bar being shown in the operative position extending horizontally from the front of a car to be towed (not shown).

For purposes merely of illustration, the tow bar of this invention is shown in FIGS. 7, 8 and 9 to be mounted on the front end of the vehicle to be towed, as by means of a pair of laterally spaced angle brackets generally indicated at 12. One leg 12' of each bracket 12 is secured to the vehicle, preferably at its frame, permanently as by welding or removably as by the bolts 14 illustrated.

The other leg 16 of each angle bracket extends longitudinally forward of the vehicle 10 and secures between them a transverse cross member 18. The cross member is a hollow tube and is secured at its ends to reinforcing stub shafts 19 (FIG. 1) welded or otherwise attached non-rotatably to the angle bracket legs 16 as disclosed in my earlier, copending patent application identified hereinbefore.

Mounted rotatably on one end of the cross member 18 is a sleeve 20. The sleeve is retained against axial movement along the cross member by confinement between the angle bracket leg 16 and a collar 22 secured to the cross member. A bracket 24 is secured to and extends radially outward from the sleeve 20.

Figure 6:
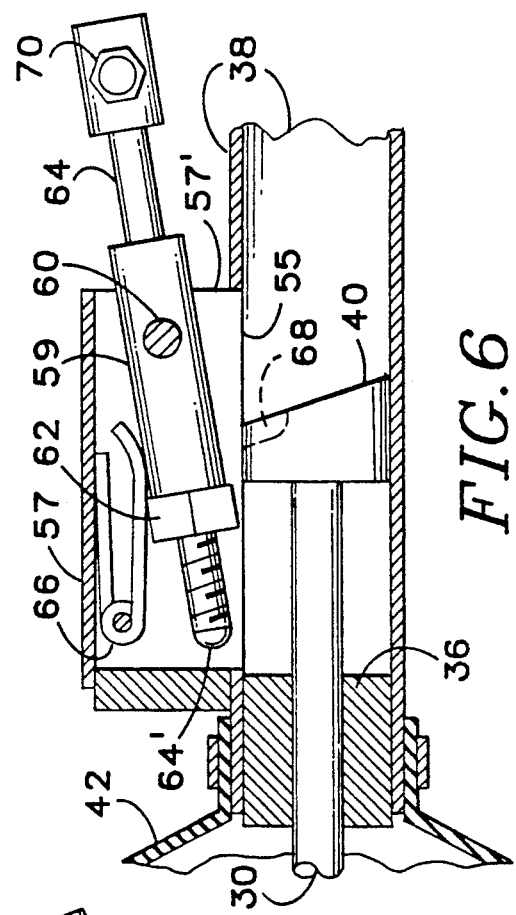
FIG. 6 is a fragmentary, sectional side elevation similar to FIG. 5 but showing the locking mechanism in unlocked condition.
Figure 5:
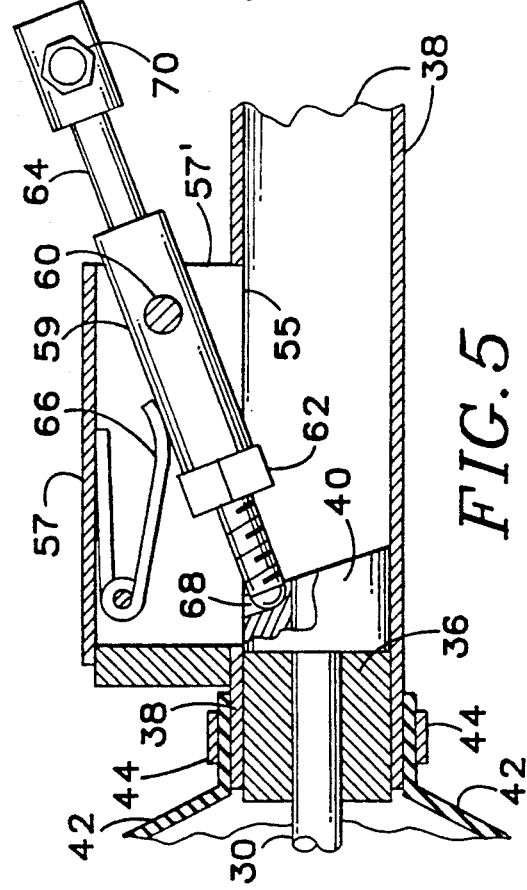
FIG. 5 is a fragmentary side elevation in section, on an enlarged scale of the locking mechanism associated with the telescoping leg members, as viewed in the direction of the arrows 5—5 in FIG. 1.

Secured pivotally to the outer end of the bracket 24, as by pivot pin 26, is an end member 28 configured to mount one end of an elongated rod 30. The end member 28 may comprise a hollow tube fixedly mounting a nut 32 on its end, the nut receiving the threaded end of the rod 30. A locking nut 34 may be provided on the threaded rod for tightening against the fixed nut 32 to frictionally secure the rod against undesired rotational movement relative to the nut 32. The opposite end of the rod 30 is captured slidably within a strengthened guide bearing 36 fixedly secured in the end of a hollow forward leg tube member 38. The terminal end of the rod 30 mounts an enlarged end guide member 40 configured for sliding movement within the hollow leg tube 38 as shown in FIGS. 5 and 6. Together, the guide sleeve 36 and the end guide member 40 provide guide means which assure non-binding, telescoping movement of the rod 30 and the hollow leg tube 38 relative to each other, and also provide extension limit means and locking means configured to secure the telescoping leg sections in operative, extended condition, as will be explained later.

Accordingly, the forward leg tube member 38 and the rod 30 are slidable one relative to the other, in telescoping manner, and thus form a first elongated towing leg member of adjustable length having a rear, or inner, first telescoping leg section, and a forward, or outer, second telescoping leg section. A flexible, protective boot 42, such as the accordion configuration shown, is provided to enclose the rod 30 and is secured at its ends to the nut 34 and the forward tube 38, as by clamps 44 shown. It will be understood that this protective boot, while allowing telescopic movement of the leg member, isolates the rod 30 from contamination by the outside environment, and hence keeps moisture, dirt and the like away from the rod, and as such prevents the accumulation of material that would affect the smooth sliding operation of the rod within the close tolerances provided by the strengthened sleeve 36. Also, the boot may be permanently filled with lubricating grease for the constant lubrication of the rod members and associated guide bearing members 36.

The forward terminal end of the telescoping tube leg member 38 is mounted to an apex frame 46 by a pivot pin 48. In the embodiment illustrated, the apex frame mounts, by any suitable connector means, the coupler component 50 of a conventional ball and socket type trailer hitch. The ball component 52 of the trailer hitch assembly is typically located on the towing vehicle as seen in FIG. 7.

A second longitudinally telescoping, elongated leg member is provided by a similar assembly of components 20', 24'-44', 48'. Accordingly, these components are identified by the same reference numerals but distinguished by a superscript.

Figure 2:
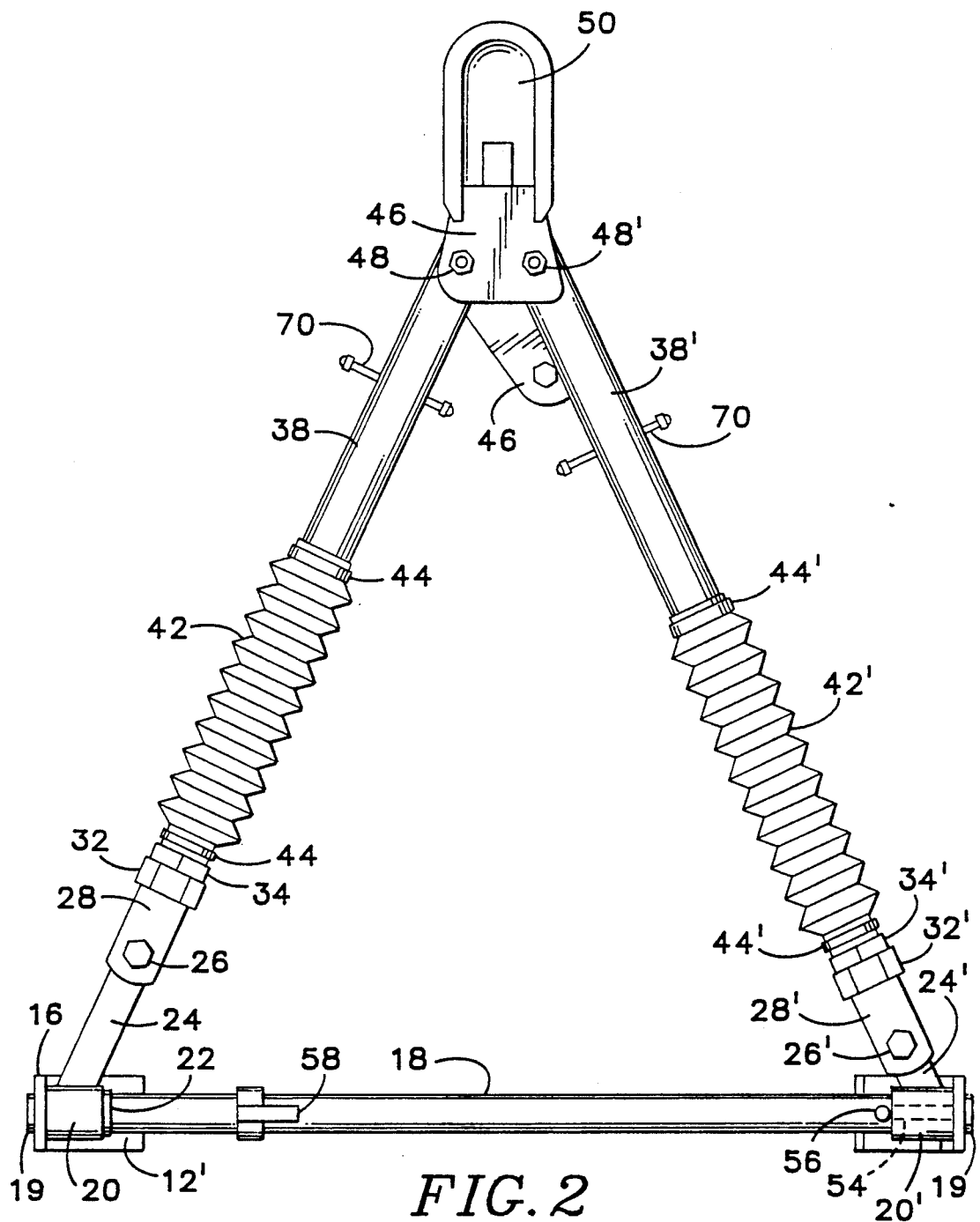
FIG. 2 is a front elevation of the tow bar of FIG. 1 in a position swung upwardly from the horizontal position of FIG. 1 in preparation for collapsing to storage position.

The second leg differs from the first described leg in the following respects: The sleeve 20' is not secured against axial movement along the cross member 18. Instead, such movement is accommodated by providing the sleeve 20' with an internal axially extending keyway 54 (FIG. 2). This keyway is located in such a manner that when the first and second elongated legs are disposed in the vertical plane illustrated in FIGS. 2, 3 and 4, the keyway is aligned with a confinement pin 56 secured to the cross member 18. In this position of alignment, the sleeve 20' may be moved to the left as in FIGS. 2 and 3. When the sleeve 20, reaches the leftwardmost position of FIG. 3, the keyway 54 has received a latch key 58 which is secured to the cross member 18. The key prevents rotation of the first and second leg assemblies about the axis of the cross member in the fully collapsed position of FIG. 4. When the assembly is in the horizontal position of FIG. 1, the keyway is rotated out of alignment with the confinement pin 56 and as such, the leg is prevented leftward movement axially along the cross member 18.

Figure 4:
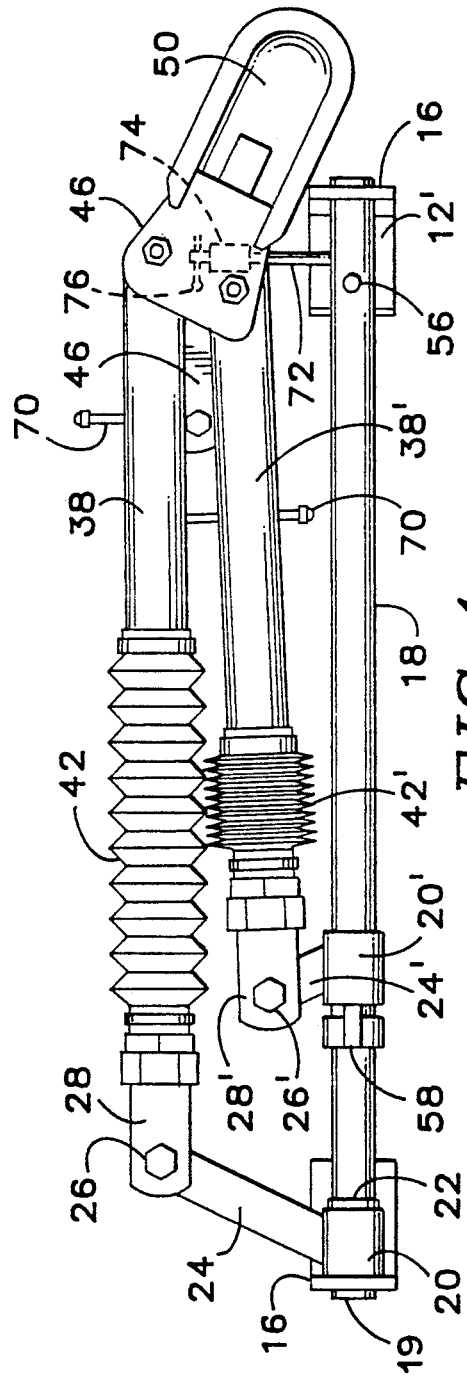
FIG. 4 is a front elevation of the tow bar of FIG. 1 in fully collapsed, storage position.

Also, bracket 24' is configured to be shorter in length than the corresponding bracket 24. The reason for this configuration is seen in FIG. 4 wherein the second telescoping leg assembly is shown underlying the first leg assembly when the tow bar is in fully collapsed storage position. The shorter bracket 24' results in the disposing of the second leg assembly closer to the crossbar so that the first leg assembly may overlie the first leg assembly when pivoted to horizontal as shown.

Lock means is provided on each leg assembly for securing the telescoping leg sections releasably in extended, towing position. In the embodiment illustrated in FIGS. 5 and 6 of the drawings, a slotted opening 55 is provided through the forward leg tube section 38, 38' and is configured in position to permit access of the securing means to the end member 40 contained therein on the terminal end of the rod 30 when the rod is in fully extended, towing condition.

Securing means in this particular embodiment comprises a mounting frame 57 attached to the forward tube member 38, 38', the mounting frame pivotally supporting an elongated barrel member 59 by pivots 60. The elongated barrel member may extend forwardly through the open end 57' of the mounting frame. The inner terminal end of the barrel fixedly mounts a threaded support nut 62, which receives an elongated, threaded screw 64 having a blunted end 64'. Tension means, illustrated herein as spring 66 is provided and arranged to constantly urge the inner terminal end of the barrel and the screw toward a downwardly extending position projecting into the hollow confines of the forward leg tube members 38, 38'.

As illustrated in FIGS. 5 and 6, the terminal end guide member 40 on the telescoping rod section 30 includes a notch 68 or annular groove provided in its outer surface arranged to provide positive engagement for the blunted end 64' of the locking screw 64. The outer face of the end member 40 may, as illustrated, be angled in configuration to assist in influencing the locking screw toward reception in the notch 68. The opposite side surface of the end member is preferably configured to be flat, as shown, for abutment with the confronting surface of the strengthened sleeve 36 as shown in FIG. 5 when the telescoping leg sections are in their fully extended, towing condition.

As will be understood, movement of the telescoping leg sections relative one to another is permitted when the locking screw is pivoted upwardly as in FIG. 6. When the rod 30 and associated end member 40 is telescoped to its fullest extended position of FIG. 5, the spring 66 urges the locking screw and barrel assembly to pivot downwardly about pivot 60 into the position shown in FIG. 5, whereupon the screw 64 may be turned to frictionally secure the rod and end member against forward movement. A handle 70 on the lock pin 64 may be provided to facilitate hand turning of the screw. Loosening the screw, by rotating it in the opposite direction, and pressing downwardly on the handle portion effects reverse pivoting of the locking structure and moves the terminal end of the screw upwardly so as to permit telescoping movement of the rod member again.

Finally, with reference to the storage position obtained in FIG. 4 of the drawings, means is provided to secure the assembly positively in that position. As seen, the bracket 12, (the right in FIG. 4) mounts an upstanding pin 72 configured to be received within the hollow confines of a sleeve member 74 fixedly mounted on the apex frame seen best in FIG. 1. The pin may be configured to receive a locking means such as cotter pin 76 configured to prevent undesirable separation of the sleeve from the pin and hence movement of the collapsed tow bar assembly from its position shown in FIG. 4.

Referring now to the hitching operation of the vehicle tow bar of this invention, the vehicle to be towed is to be moved into a position behind the towing vehicle in the proximity of its hitch component. The operator grasps the hitch component 50 on the tow bar and lifts it upwardly from the position shown in FIG. 4 to the position shown in FIG. 3, whereupon the second towing leg assembly designated by numerals in superscript is slid axially toward its respective end of the cross bar, assuming the position shown in FIG. 2 of the drawings. The now "A" frame tow bar assembly is pivoted downwardly to a more horizontal position as shown in FIGS. 1 and 7 of the drawings, and the hitch member is manipulated toward and onto the hitch component on the towing vehicle and secured as in FIG. 8 of the drawings. The towing vehicle is moved forwardly to assure that both telescoping leg sections are extended into their fully extended condition, whereupon the spring tension locking screws will drop downwardly into abutting engagement with the end members 40 (FIGS. 5 and 6), and assure against any retracting telescoping once the fully extended position is achieved. The operator then tightens the locking screws 64, 64' to securely lock the telescoping leg sections in fully extended, towing condition. The hitching operation thus complete, the towing vehicle may be operated to tow the vehicle attached therebehind.

Figure 3:
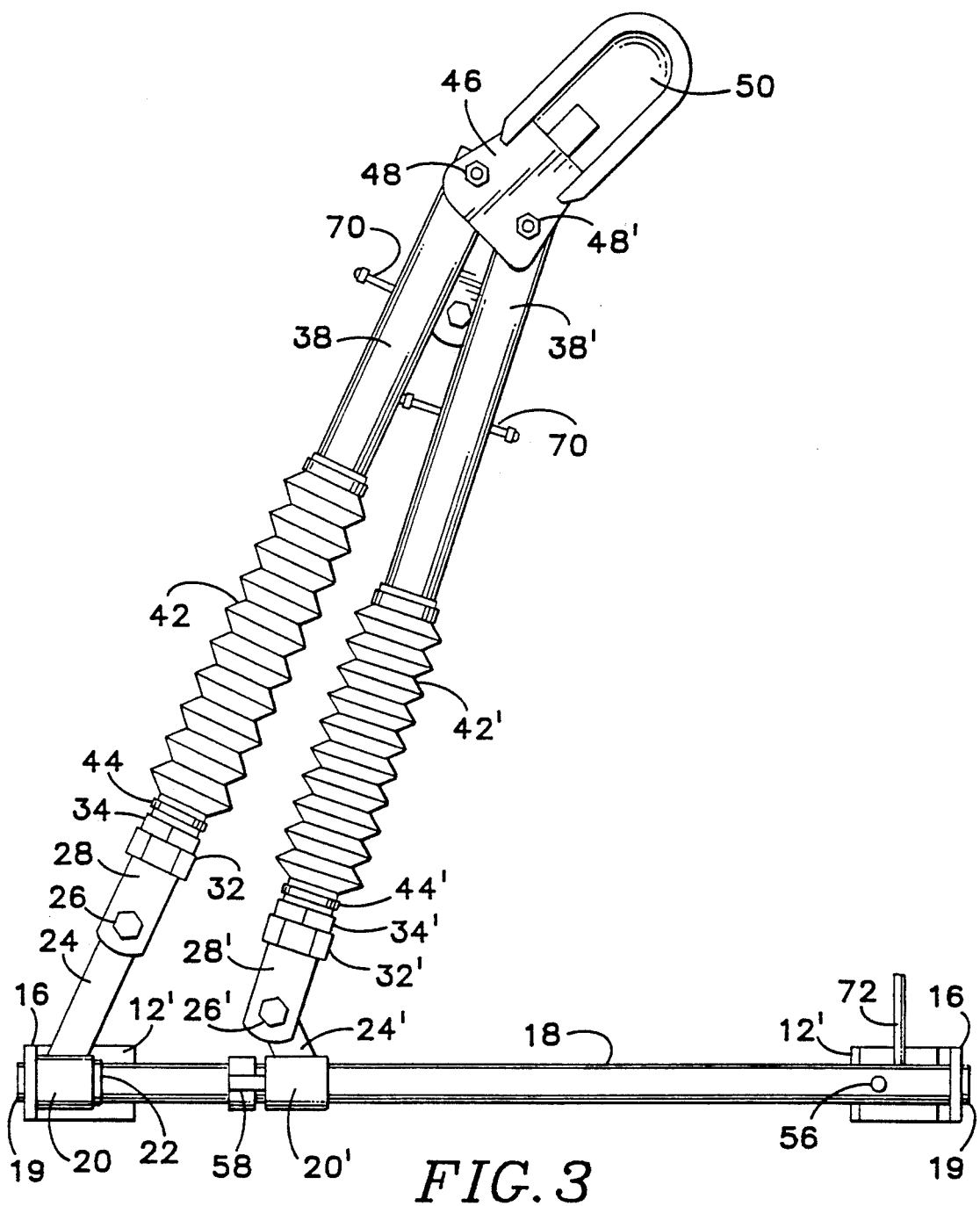
FIG. 3 is a front elevation of the tow bar of FIG. 1 in an intermediate position of collapsing to storage position.

The disconnection and storage procedure involves simply loosening the locking screws 64, 64' by rotating them in the opposite direction and pivoting them upwardly so as to permit the forward leg members 38, 38' movement relative to the rod members 30, uncoupling the trailer hitch component and pivoting the tow bar assembly in consecutive stages from the position of FIG. 1 to the position of FIG. 2, FIG. 3, and then to FIG. 4, whereupon it may be secured in locked, stored condition on the vehicle to be towed.

From the foregoing it will be apparent to those skilled in the art that various modifications and changes may be made in the size, shape, type, number and arrangement of parts described hereinbefore without departing from the spirit of this invention and the scope of the appended claims.

Having thus described my invention and the manner in which it may be used, I claim:

1. A vehicle tow bar, comprising:
   a) an elongated cross member (18) having a longitudinal axis,
   b) a pair of mounting brackets (12) configured to be attached to laterally spaced positions at the front end of a vehicle to be towed,
   c) first and second elongated leg members each having first and second telescoping leg sections (30,38) having an inner section (30) movable within an outer section (38) between extended and retracted positions,
   d) sleeve means (20,20') mounting the first telescoping leg sections (30,30') of the first and second leg members on the cross member (18) for rotation about the longitudinal axis of the cross member, one of the sleeve means (20') being secured at one end of the cross member against axial movement along said cross member, the other sleeve means (20) being mounted on the cross member (18) for axial movement along the cross member for axial movement of the associated one of the leg members toward and away from the second leg member,
   e) apex frame means (46) connecting the second telescoping leg sections (38,38') of the first and second leg members together,
   f) first trailer hitch coupling means (50) configured for releasable connection to a companion second trailer hitch coupling means (52) on a towing vehicle,
   g) connector means interconnecting the first trailer hitch coupling means and the apex frame means,
   h) guide bearing means (36) secured in the telescoping end of each outer telescoping leg section (38,38') and configured to slidable receive therethrough the associated inner telescoping leg section (30,30'),
   i) an enlarged end guide means (40) secured to the telescoping end of each inner telescoping leg section (30,30') and configured to slidably engage the inner surface of the associated outer telescoping leg section (38,38'), and
   j) locking screw means (64) mounted on each outer telescoping leg section (38,38') releasably engageable with the enlarged end guide means (40) on the associated inner telescoping leg section (30,30') for releasably securing the inner and outer telescoping leg sections (30,30' and 38,38') in fully extended position.

2. The vehicle tow bar of claim 1 wherein the locking screw means includes a threaded support mounted pivotally on each outer telescoping section, and a threaded screw extending through the threaded support for pivotal movement into and out of engagement with the enlarged end guide means, the threaded screw being operable when engaging the enlarged end guide means to be rotated to move said enlarged end guide means into abutting engagement with the guide bearing means.

3. The vehicle tow bar of claim 1 including a flexible, extendable boot member on each leg member enclosing therein the inner telescoping leg section for containing lubricant for the telescoping leg sections and inhibiting the entrance of contaminating matter.

4. The vehicle tow bar of claim 3 wherein the boot member is of accordion configuration secured at one end to the outer end of the inner telescoping leg section and at the opposite end to the outer telescoping leg section.

* * * * *

UNITED STATES PATENT AND TRADEMARK OFFICE
CERTIFICATE OF CORRECTION

PATENT NO. : 5,224,960
DATED : 6 July 1993
INVENTOR(S) : LEE H. DUNCAN

It is certified that error appears in the above-identified patent and that said Letters Patent is hereby corrected as shown below:

Column 1, line 12, "U.S. Pat. No. 5,071,153, dated Dec. 1, 1991 the present" should read: --to U.S. Pat. No. 5,071,153, dated 10 Dec. 1991 the present--.

Signed and Sealed this

Twenty-fifth Day of January, 1994

Attest:

BRUCE LEHMAN

*Attesting Officer*     *Commissioner of Patents and Trademarks*